United States Patent
Chambliss et al.

(10) Patent No.: US 8,578,094 B2
(45) Date of Patent: *Nov. 5, 2013

(54) FULL-STRIPE-WRITE PROTOCOL FOR MAINTAINING PARITY COHERENCY IN A WRITE-BACK DISTRIBUTED REDUNDANCY DATA STORAGE SYSTEM

(75) Inventors: David D. Chambliss, Morgan Hill, CA (US); James L. Hafner, San Jose, CA (US); Tarun Thakur, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,198

(22) Filed: Aug. 14, 2012

(65) Prior Publication Data

US 2012/0311255 A1   Dec. 6, 2012

Related U.S. Application Data (63) Continuation of application No. 12/710,151, filed on Feb. 22, 2010.

(51) Int. Cl.
*G06F 12/00* (2006.01)
*G06F 13/00* (2006.01)
*G06F 13/28* (2006.01)

(52) U.S. Cl.
USPC .......................................................... 711/114

(58) Field of Classification Search
USPC .......................................................... 711/114
See application file for complete search history.

(56) References Cited

U.S. PATENT DOCUMENTS

| 4,916,605 | A | 4/1990 | Beardsley et al. |
| 5,388,108 | A | 2/1995 | DeMoss et al. |

(Continued)

FOREIGN PATENT DOCUMENTS

| EP | 0 594 464 A2 | 4/1994 |
| JP | 07-152499 | 6/1995 |
| JP | 2006252414 A | 9/2006 |

OTHER PUBLICATIONS

Vasken Bohossian et al, Computing in the RAIN: A Reliable Array of Independent Nodes (Feb. 2001), available at: http://ieeexplore.ieee.org/stamp/stamp.jsp?tp=&arnumber=910866&tag=1 (last visited Oct. 19, 2012).*

(Continued)

*Primary Examiner* — Kevin Verbrugge
*Assistant Examiner* — Craig Goldschmidt
(74) *Attorney, Agent, or Firm* — Kenneth L. Sherman, Esq.; Michael Zarrabian, Esq.; Sherman & Zarrabian LLP (57) ABSTRACT

Data storage reliability is maintained in a write-back distributed data storage system including multiple nodes. Information is stored as a stripe including a collection of a data strips and associated parity strips, the stripe distributed across data and parity nodes. Each data node maintains the data strip holding a first copy of data, and each parity node maintains a parity strip holding a parity for the collection of data strips. A driver node initiates a full-stripe-write parity update protocol for maintaining parity coherency in conjunction with other nodes, to keep the relevant parity strips coherent. Parity is determined directly by computing parity strips for all data strips of a stripe. Any node may function as a driver node.

13 Claims, 7 Drawing Sheets

(56) References Cited

U.S. PATENT DOCUMENTS

| | | | |
|---|---|---|---|
| 5,574,882 A * | 11/1996 | Menon et al. | 711/114 |
| 5,627,990 A | 5/1997 | Cord et al. | |
| 5,720,025 A | 2/1998 | Wilkes et al. | |
| 6,101,615 A * | 8/2000 | Lyons | 714/6.21 |
| 6,223,323 B1 | 4/2001 | Wescott | |
| 6,298,415 B1 | 10/2001 | Riedle | |
| 6,353,895 B1 * | 3/2002 | Stephenson | 714/5.11 |
| 6,427,212 B1 | 7/2002 | Frey, Jr. | |
| 6,446,220 B1 | 9/2002 | Menon | |
| 6,446,237 B1 | 9/2002 | Menon | |
| 6,526,477 B1 * | 2/2003 | Yuan et al. | 711/114 |
| 6,542,960 B1 | 4/2003 | Wong et al. | |
| 6,553,511 B1 | 4/2003 | DeKoning et al. | |
| 6,708,285 B2 * | 3/2004 | Oldfield et al. | 714/11 |
| 6,718,444 B1 | 4/2004 | Hughes | |
| 6,725,392 B1 * | 4/2004 | Frey et al. | 714/6.12 |
| 6,732,290 B1 | 5/2004 | Perry et al. | |
| 6,898,668 B2 | 5/2005 | Thompson et al. | |
| 6,928,515 B2 | 8/2005 | Hassner et al. | |
| 6,950,901 B2 | 9/2005 | Chiu et al. | |
| 6,970,987 B1 | 11/2005 | Ji et al. | |
| 6,983,396 B2 | 1/2006 | Brant et al. | |
| 6,993,676 B2 | 1/2006 | Corbin et al. | |
| 7,062,644 B2 * | 6/2006 | Bish et al. | 713/1 |
| 7,093,157 B2 | 8/2006 | Hajji | |
| 7,143,308 B2 | 11/2006 | Tseng et al. | |
| 7,149,847 B2 | 12/2006 | Frey, Jr. et al. | |
| 7,159,150 B2 | 1/2007 | Kenchammana-Hosekote et al. | |
| 7,206,991 B2 | 4/2007 | Chatterjee et al. | |
| 7,320,089 B2 | 1/2008 | Yamamoto et al. | |
| 7,386,757 B2 | 6/2008 | Lindenstruth et al. | |
| 7,490,270 B2 | 2/2009 | Cherian | |
| 7,516,354 B2 | 4/2009 | Nguyen et al. | |
| 7,529,970 B2 | 5/2009 | Hartline et al. | |
| 7,653,829 B2 | 1/2010 | Kim et al. | |
| 7,822,921 B2 | 10/2010 | Taylor | |
| 7,991,951 B2 | 8/2011 | Maroney et al. | |
| 8,103,903 B2 | 1/2012 | Hafner et al. | |
| 8,103,904 B2 | 1/2012 | Hafner et al. | |
| 8,156,368 B2 | 4/2012 | Chambliss et al. | |
| 2002/0091897 A1 * | 7/2002 | Chiu et al. | 711/114 |
| 2003/0225899 A1 | 12/2003 | Murphy | |
| 2007/0028145 A1 | 2/2007 | Gerhard et al. | |
| 2007/0067677 A1 | 3/2007 | Weiberle et al. | |
| 2008/0040553 A1 | 2/2008 | Ash et al. | |
| 2009/0157958 A1 * | 6/2009 | Maroney et al. | 711/114 |
| 2010/0180153 A1 | 7/2010 | Jernigan, IV et al. | |
| 2011/0246732 A1 * | 10/2011 | Amano et al. | 711/162 |

OTHER PUBLICATIONS

Crews, C.V. et al., "Parity Preservation for Redundant Array of Independent Direct Access Storage Device Data Loss Minimization and Repair," IBM Technical Disclosure Bulletin, Mar. 1993, pp. 473-478, vol. 36, No. 3, IBM Corporation, USA.

Hafner, J.L., "WEAVER Codes: Highly Fault Tolerant Erasure Codes for Storage Systems," Proceedings of the 4th USENIX Conference on File and Storage Technologies (FAST '05), 2005, pp. 211-224, vol. 4, USENIX Association, USA.

Solsie.Com, "IBM Acquired XIV Nextra: Targeting Web 2.0 Storage Need," Jan. 11, 2008, downloaded at http://solsie.com/2008/01/ibm-acquired-xiv-nextra-targeting-web-20-storage-need/, 7 pages, SolSie.com, USA.

International Search Report and Written Opinion mailed Mar. 22, 2011 for International Application No. PCT/EP2011/052572 from European Patent Office, pp. 1-12, Rijswijk, The Netherlands.

Mourad, A.N. et al., "Recovery Issues in Databases Using Redundant Disk Arrays," Journal of Parallel and Distributed Computing, Jan. 1993, pp. 75-89, vol. 17, No. 1, Academic Press, USA.

U.S. Non-Final Office Action for U.S. Appl. No. 12/710,101 mailed Apr. 7, 2011.

U.S. Non-Final Office Action for U.S. Appl. No. 12/710,123 mailed Apr. 12, 2011.

U.S. Non-Final Office Action for U.S. Appl. No. 12/710,162 mailed Apr. 15, 2011.

U.S. Notice of Allowance for U.S. Appl. No. 12/710,162 mailed Sep. 19, 2011.

U.S. Notice of Allowance for U.S. Appl. No. 12/710,123 mailed Sep. 20, 2011.

U.S. Non-Final Office Action for U.S. Appl. No. 12/710,101 mailed Sep. 28, 2011.

U.S. Notice of Allowance for U.S. Appl. No. 12/710,101 mailed Dec. 1, 2011.

U.S. Non-Final Office Action for U.S. Appl. No. 12/710,151 mailed Nov. 7, 2012.

U.S. Advisory Action for U.S. Appl. No. 12/710,151 mailed May 1, 2013.

U.S. Final Office Action for U.S. Appl. No. 12/710,151 mailed Feb. 13, 2013.

* cited by examiner

FULL-STRIPE-WRITE PROTOCOL FOR MAINTAINING PARITY COHERENCY IN A WRITE-BACK DISTRIBUTED REDUNDANCY DATA STORAGE SYSTEM

CROSS-REFERENCE TO RELATED APPLICATIONS

This patent application is a continuation patent application of U.S. patent application Ser. No. 12/710,151, filed on Feb. 22, 2010, the disclosure of which is incorporated herein its entirety by reference.

BACKGROUND

1. Field of the Invention

The invention relates generally to maintaining data reliability. In particular, the present invention relates to parity coherency in data storage.

2. Background

In information technology (IT) systems, often data is stored with redundancy to protect against component failures resulting in loss of data. Such data redundancy can be provided by simple data mirroring techniques or via erasure coding techniques. Erasure codes are the means by which storage systems are made reliable. In erasure coding, data redundancy is enabled by computing functions of user data such as parity (exclusive OR) or other more complex functions such as Reed-Solomon encoding. A Redundant Array of Inexpensive Disks (RAID) stripe configuration effectively groups capacity from all but one of the disk drives in a disk array and writes the parity (XOR) of that capacity on the remaining disk drive (or across multiple drives). When there is a failure, the data located on the failed drive is reconstructed using data from the remaining drives.

When data is updated by a host device, the redundancy data (parity) must also be updated atomically to maintain consistency of data and parity for data reconstruction or recovery as needed. In most cases, such updates can be time consuming, as they usually involve many storage device accesses. To mitigate this effect, a redundancy system may employ a write-back or "fast write" capability wherein one or more copies of new host write data (i.e., host data and one or more copies thereof) are stored/written in independent cache components of the system. The write is acknowledged as complete to the host and the parity updates are delayed to a more suitable time (e.g., at de-stage time of new write data).

In monolithic systems (e.g., a controller with two redundant processors where all the storage disks are accessible to both processors), atomic parity update can be more easily managed by one of the processors with a full knowledge of events during the process. Recovery from error or interruption is simplified. However, in a distributed redundancy data storage system including a collection of loosely coupled processing nodes that do not share the same disks, there are many more components, less shared knowledge and many more failure states and events. Consequently, achieving atomic parity update is more difficult. "Distributed" means that it is a collection of nodes. "Redundant" means that it must have erasure coding. In a write-thru system (without fast write), if a parity update fails prior to acknowledgement of the write to the host, then the write fails and recovery is driven by the host. However, with a distributed redundancy storage system employing fast write, the host data is committed by the distributed redundancy storage system and must be reliably available at any future time. Consequently, the atomic parity update must be managed internally within the distributed redundancy storage system.

BRIEF SUMMARY

Data storage reliability is maintained in a write-back distributed data storage system including multiple nodes, each node comprising a processor and an array of failure independent data storage devices. User data is stored as collection of stripes, each stripe comprising a collection of data strips and associated parity strips, the stripes distributed across multiple corresponding data owner nodes and multiple corresponding parity owner nodes. For each stripe, data owner node maintains the associated data strip holding a first copy of data, and a parity owner node maintains a parity strip holding a parity for the collection of data strips, wherein parity coherency is maintained.

A full-stripe-write (FSW) parity update protocol is performed for maintaining parity coherency, wherein a driver node drives parity coherency with the corresponding parity nodes, in conjunction with the other data and parity nodes, by determining parity directly by computing parity strips for all data strips of a stripe in order to keep the relevant parity strips coherent.

Another embodiment provides a write-back distributed data storage system, comprising multiple nodes, each node comprising a data managing processor and an array of failure independent data storage devices. The nodes are configured for storing information as a stripe including a collection of data strips and associated parity strips, the stripes distributed across data and parity nodes, each data node configured for maintaining an associated data strip holding a first copy of data, and each parity node configured for maintaining a parity strip holding a parity for the collection of data strips.

A driver node is further configured for initiating a FSW parity update protocol for maintaining parity coherency in conjunction with other nodes comprising data and parity nodes, by determining parity directly by computing parity strips for all data strips of a stripe in order to keep the relevant parity strips coherent, such that any node may function as a driver node.

Another embodiment provides a computer program product for maintaining data storage reliability in a write-back distributed data storage system including multiple nodes. The computer program product comprises a computer readable storage medium having computer usable program code embodied therewith, the computer usable program code comprising computer usable program code configured to store information as a stripe including a collection of data strips and associated parity strips, the stripes distributed across data and parity nodes. The computer usable program code further comprises computer usable program code configured for each data node to maintain an associated data strip holding a first copy of data, and each parity node maintain a parity strip holding a parity for the collection of data strips.

The computer usable program code further comprises computer usable program code configured to initiate a FSW parity update protocol at a driver node for maintaining parity coherency in conjunction with other nodes comprising data and parity nodes, by determining parity directly by computing parity strips for all data strips of a stripe in order to keep the relevant parity strips coherent, such that any node may function as a driver node.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments providing data redundancy in information technology (IT) systems. While the following description will be described in terms of such systems for clarity and placing the invention in context, it should be kept in mind that the teachings herein may have broad application to all types of systems, devices and applications.

Most distributed storage systems either perform only write-thru or coordinate parity computations at the host or client. Coordinating parity computations enables recovery and coordination in a manner similar to a write-thru system. The write-thru and coordinating parity computations have similar latency costs, as more work is performed before the write is fully complete to the application. As such, improvement in reducing the complexity of parity update directly improves the distributed storage system performance and reliability.

A full-stripe-write (FSW) protocol for maintaining parity coherency in a write-back distributed redundancy data storage system is provided. In one embodiment, the FSW protocol employs a data-driven FSW parity update protocol with fast write to improve processing for parity updates spread across nodes of the system and yet meets client guarantees for superior reliability and system design simplicity. In one implementation, when all data strips for a stripe are in memory (e.g., when just written by the host), the FSW protocol may be performed wherein the parity strips are computed directly from the data strips (as opposed to, for example, by a read-modify-write process).

The FSW protocol results in updates on all data and parity nodes. This provides the opportunity to avoid disk reads and data movements, and thus improves performance. The term data-driven means that a full stripe's worth of fast-write data is, or is likely to be, present in the system. The presence or likely presence of such data may cause a node (i.e., driver node) to initiate/drive the FSW protocol.

In general, the driver node can be any node in the stripe, either a data node or a parity node. The driver node can be determined beforehand or self-elected. Further, one node may be assigned the role of driver node. In addition, more than one node (e.g., any parity node), but not all nodes (e.g., excluding data nodes) may be potential driver nodes. The FSW protocol addresses the situation where more than one node acts as a driver node at the same time.

Figure 1:
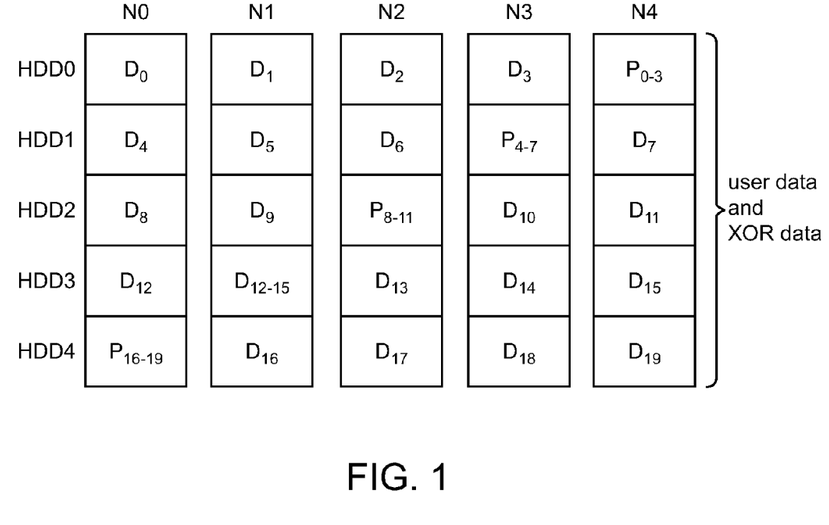
FIG. 1 shows an example distributed redundancy storage system.

The following terminology is provided to help in understanding the description further below.

node a computer and disk enclosure with a distributed redundancy module, processor, memory, disks, power supply, etc., in a data storage system.

driver node a node that initiates the FSW protocol described herein.

primary disk a disk within a node that holds a first copy of host data.

data node a node that holds the primary disk for some data or parity (along with other disks)—this is also called the data owner.

user data data written by a host or client to a storage system for possible later retrieval.

parity data redundancy calculated by a scheme to recover lost user data.

strip a chunk (block) of user data or parity.

stripe a collection of data strips and parity strips that are connected by parity calculations (an example is shown in FIG. 1 described further below).

parity node a node that holds one of the parity strips for a collection of data strips in a stripe (a node may be either a data node only, a parity node only or be simultaneously a data node and a parity node for a given stripe).

In an example stripe, n+1 nodes are required to store the data of n independent nodes. FIG. 1 shows a distributed redundancy storage system stripe configuration with an array of nodes (i.e., N0, . . . , N4), each node having multiple disk drives (i.e., HDD0, . . . , HDD4), effectively groups capacity from all but one of the nodes and writes the parity P (e.g., XOR) of that capacity on remaining nodes or across multiple nodes (as shown). For example, the data strips $D_0, \ldots, D_3$ in HDD0 of nodes N0, . . . , N3, respectively, are for user data, and a parity strip $P_{0-3}$ in HDD0 of node N4 is for corresponding parity data (e.g., XOR of $D_0, \ldots, D_3$). The data strips $D_0, \ldots, D_3$ and parity strip $P_{0-3}$ form a stripe. Spreading the parity data across the nodes as shown allows spreading the task of reading the parity data over several nodes as opposed to just one node. Writing on a node in a stripe configuration requires that one or more new parities be calculated for this new data and the new parities be written over the old parities in each of the relevant parity nodes.

According to the data-driven FSW parity update protocol, each primary data node generally acts in conjunction with the other data nodes, of the same stripe, in keeping its relevant parity strips coherent and correct. For example in FIG. 1, data node N0 owns data strip $D_0$ on primary disk HDD0 and drives nodes N4 for coherency and reliability of its data or parity with respect to the rest of the stripe formed by $D_0, \ldots, D_3$, $P_{0-3}$. There is no restriction that information on a disk be only data or only parity. Other embodiments may have disks within a node containing data for one stripe and parity data for the same stripe or another stripe.

Figure 2:
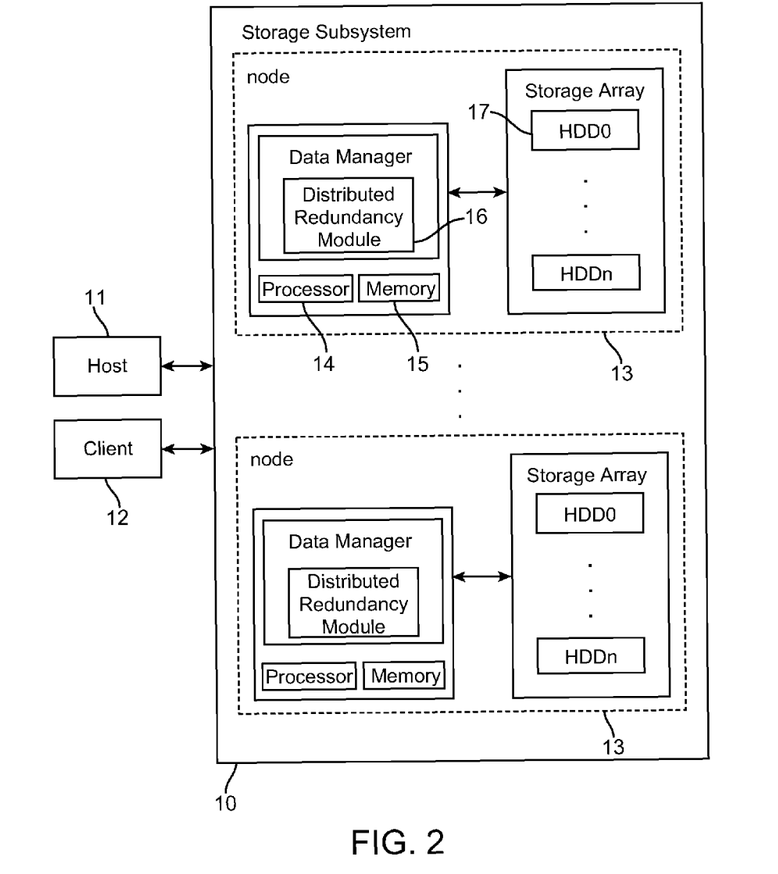
FIG. 2 shows a block diagram of a system for full-stripe-write (FSW) protocol for maintaining parity coherency in a write-back distributed redundancy data storage system.

FIG. 2 shows a write-back distributed redundancy data storage system 10 that implements a data-driven FSW parity update protocol, according to an embodiment of the invention. The system 10 is utilized for storing data from a host system 11 and/or a client system 12. The system 10 includes multiple nodes 13. Each node comprises a processor 14, memory 15, a data manager including a distributed redundancy module 16, and an array of storage devices such as hard disk drives 17 (e.g., HDD0, . . . , HDDn). In one implementation, the distributed redundancy module 16 comprises program code for execution by the processor. In another implementation, the distributed redundancy module comprises firmware.

The distributed redundancy module 16 in each node implements the data-driven FSW parity update protocol for maintaining parity coherency in the data storage system 10. Parity update is performed in the system 10 that uses fast write (write-back) behavior at a time subsequent to the completion of any fast write operations. According to the data-driven FSW parity update protocol described herein, since each driver node generally initiates the FSW protocol independently of, but in conjunction with the other driver nodes in the stripe in keeping their relevant parity strips coherent and correct, the overall explicit coordination between driver nodes of the same stripe is reduced, and coordination is performed by less explicit means, such as protocol serialization (described further below). In general, the driver node can be any node in the stripe, either a data node or a parity node. Preferably, each parity calculated based on a different parity calculation formula.

For the example implementations described herein, the distributed redundancy storage system 10 (FIG. 2) is fault tolerant to two storage device failures (either disk or node). Those skilled in the art recognize that generalization to higher fault tolerance is within the scope of the invention. Each data strip is encoded into two parity strips. This is extendible to more than two parity strips for higher fault tolerant systems. The data-driven FSW parity update protocol enables a data node 13 to maintain (either in memory or on disk) at least two copies of data for a strip (new fast write data and parity integrated data). The data-driven FSW parity update protocol is data driven since it is initiated by a driver node when the driver node detects, or expects, the presence of a full stripe worth of fast write data in the stripe. The parity update protocol follows a forwarded or chained messaging protocol between the participants (i.e., from the driver node through each of other nodes, both data and parity, in the stripe in a specified order, with responses following the reverse order). The data-driver FSW protocol may be initiated by any potential driver node in the stripe, without conflict, provided the forwarded or chained messaging protocol between the participating nodes is defined appropriately. The parity update protocol is implemented in each of the nodes 13 in FIG. 2. Each node 13 serves a data node for certain data, and serves as a parity node for certain other data, each node being capable of performing each of the functions of the protocol (driver, first parity, second parity, etc.).

Any potential driver node can initiate a FSW parity compute and commit protocol on a distributed storage system 10 employing fast write capabilities. A driver node initiates a FSW parity data update protocol on the distributed storage system 10 that employs fast write capabilities to compute parity data that is used to recover lost data. The FSW parity data update protocol includes:

a. a message forwarding protocol.
   b. one phase: lock, compute and commit/unlock phase.
   c. a fixed ordering of all the nodes is used to define the forwarding order of messages (the fixed order is defined with respect to each potential driver node).

A recovery protocol is driven by a successor driver (lowest survivor in the forward sequence). The driver node is the initiator of the protocol. If the driver terminates, then the next node in the forwarding chain assumes that role (i.e., becomes successor driver or successor initiator). The role of the driver is to complete the protocol by forcing it to roll forward to completion.

Figure 3:
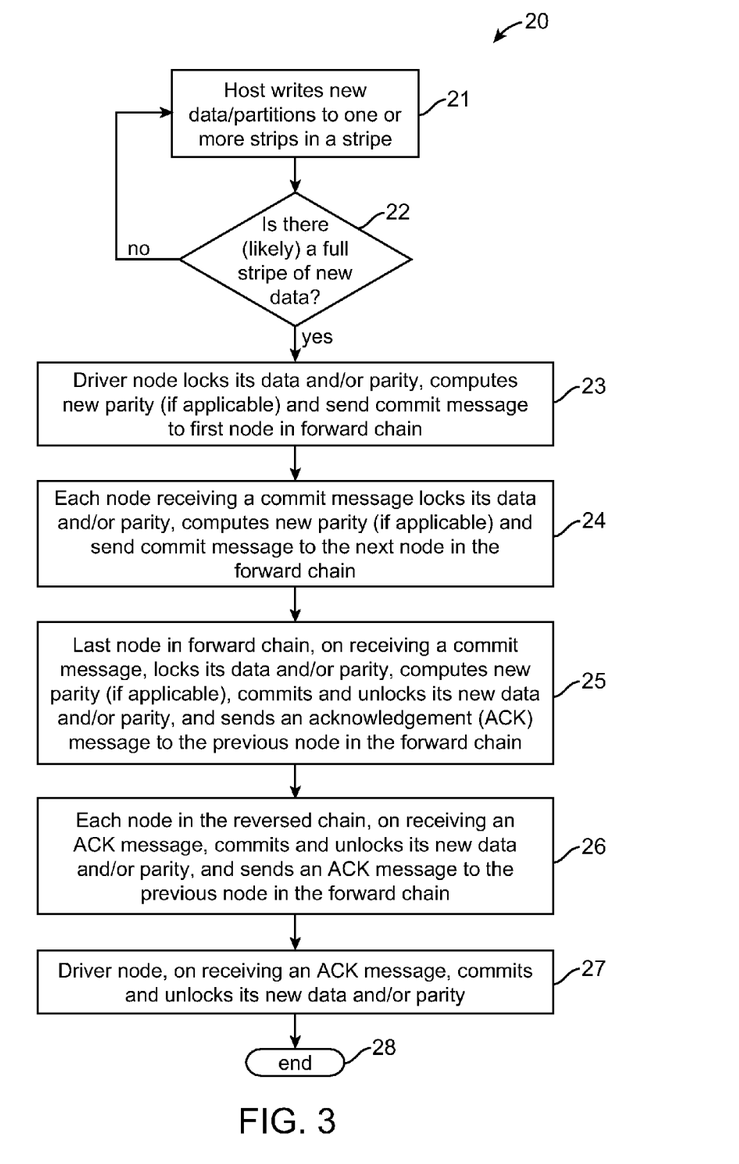
FIG. 3 shows a flowchart of a FSW protocol process for maintaining parity coherency in a write-back distributed redundancy data storage system.

FIG. 3 shows a flowchart of a process 20 implementing an embodiment of the FSW parity data update protocol, including:

Block 21: Host writes one or more new data partitions.
   Block 22: A potential driver node determines whether a full stripe of new data is present in the stripe. If not, return to Block 21 to receive new data. If so, proceed to Block 23.
   Block 23: A driver node locks its new data and/or parity from update, computes a new parity, if applicable (that is, if it is a parity node) and sends commit message to its "first" node (according to the ordering of the forwarding message chain).
   Block 24: Each node, on receipt of a commit message, locks its data and/or parity from update, computes new parity if applicable (that is, if it is a parity node) and forwards the commit message to the next node in forward order of the messaging chain. The lock at each node means no other operation should take place that affects the data or parity at that node during this protocol (until the unlock step).
   Block 25: The last node in the forwarding message chain, on receiving a commit message, locks its data and/or parity, computes new parity if applicable (that is, if it is a parity node) commits and unlocks its new data and/or parity, and sends an acknowledgement response back to the previous node in the forwarding chain. The previous node is the sender of the commit message received at the node. The step completes the actions of the last node with respect to this protocol.
   Block 26: Each node, on receiving an acknowledgement message from the node to which it sent the commit message, commits and unlocks its new data and/or parity and sends an acknowledgement message to the previous node in the forward chain. The previous node is the sender of the commit message received at the node. This step completes the actions of this node with respect to this protocol.
   Block 27: The driver node, on receiving the acknowledgement message from the first node to which it sent the commit message, commits and unlocks its new data and/or parity.
   Block 28: The protocol is complete.

The message communication may be via a communication line, host, bus connecting the nodes, etc., implementing a message forwarding protocol. As noted, the driver node may be a predetermined node, or one in a subset of the nodes or one of any of the nodes. All nodes participate in the protocol (not just one data node and the parity nodes). There is only one round of communication including: outgoing FSW commit message and a return ACK message.

The specific forward message ordering of the other nodes in the stripe for each potential driver node and the locking/unlocking steps are arranged so that if the protocol is initiated concurrently by two or more driver nodes that share one or more parity nodes, the protocol is deadlock and starvation free. When a node, which has its data or parity (or both) locked during a FSW parity update protocol initiated from one driver node, receives a parity update protocol message initiated from another driver node, it can either reject the second parity update request (by an "abort/try again later" response) or may hold the second message until the completion of its unlock step for the first parity update protocol, at which point it may proceed with the second parity update protocol. A second parity update protocol may be a FSW protocol as described herein or may also be a read-modify-write or read-other protocol.

The invention provides a data driven protocol as well as locking/forwarding/recovery. The explicit payloads and computation properties are not essential to the invention. There are many alternatives that anyone skilled in the art will appreciate.

As noted, each data node is capable of maintaining (either in memory or on disk, or both) at least two versions of the data for a strip. The first copy is the fast write copy comprising new data that was written into the storage system by a host or client but has not yet been integrated into the parity strips. The second copy is the parity-integrated copy/version that has been incorporated into the mathematical relationships defining the parity values. Fast write versions transition to the parity integrated version at completion of the parity update protocol at all relevant data and parity nodes (the prior parity-integrated version can be discarded as well).

Similarly, each parity node maintains a version of its parity strip value that contains (per the mathematical relationship defining that parity value) the current parity-integrated value for each of the data strips computed into that parity strip. Each parity node also manages a working copy that is computed as an intermediate value during the parity update protocol. At the end of the parity update protocol (as viewed by each parity node), the parity node transitions the working copy to the parity-integrated value and discards the previous parity-integrated value. The "working" copy may be updated in multiple steps (e.g., one for each data strip that gets calculated together). This working copy cannot override the parity integrated copy until the commit phase.

For each potential driver node, there must be a defined ordered relationship of the other nodes in the stripe in sequence. For example, if a driver node is a data node and has two parity nodes P0 and P1 and other data nodes N1, N2, N3, then the ordered relationship may be P0<P1<N1<N2<N3, or P1<P0<N3<N2<N1. As such, each driver node has a first node in its forwarding order. The defined ordered relationship may be defined cyclically with respect to some numbering of the nodes. The ordered relationship may be different for each driver node or each driver node may share a portion of the ordering in common. For example, if a stripe has two parity nodes, P0 and P1, and data nodes N0, N1, N2, N3 and each of P0 and P1 are potential driver nodes, then the order for P0 may be P1<N0<N1<N2<N3 and for P1 it may be P0<N0<N1<N2<N3. This set of ordered relationships (one for each potential driver node) is specified for the entire stripe so as to avoid a deadlock or starvation condition among concurrently initiated parity update protocols. The ordering is dependent on the specific erasure code used and the assignment of potential driver node responsibilities.

As noted, the parity update protocol involves a single lock/preparation and a commit/unlock phase, implemented with a single round of messages. The lock/preparation involves locking the data and/or parity from update by another protocol. The commit/unlock transitions the data and/or new computed parity to the parity integrated version. On the driver node, the lock/preparation is done before the first message is sent to the first node in the forward order and the commit/unlock occurs on receipt of an acknowledgement from the first node. On any intermediate node in the forward order, the lock/preparation occurs on receipt of the commit message and before the forwarding of the commit message, and the commit/unlock occurs on receipt of the acknowledgement and before the forwarding (back up the forward chain) the acknowledgement message. On the last node in the forward chain, the lock/preparation occurs on receipt of the commit message and the commit/unlock occurs before sending the first acknowledgement message.

The computation phase in the preparation step may occur in parallel with the forwarding of the commit message. However, it must complete before commit/unlock and the sending or forwarding of the acknowledgement message.

If a node in the forwarding chain cannot complete the requested action for any reason, the node responds to the commit message with a FAILURE message. On receipt of a FAILURE message, each node in the reverse chain discards any intermediate parity computation (if applicable), and unlocks its data and/or parity without changing the previous parity integrated version of the data; it then forwards the FAILURE message back up the message chain. A data node may be unable to complete the FSW parity update protocol because it does not have new fast write data to commit. A parity node may be unable to complete the FSW parity update protocol if it does not have enough new fast write data to compute its new parity (without reading data from a disk or requesting data from another node). Furthermore, a node may not be able to complete the FSW parity update protocol if the data and/or parity is already locked by another parity update protocol, which may be another FSW protocol, a read-modify-write or a read-other protocol. Other conditions may also exist that prevent a node from completing its FSW parity update protocol steps.

The FSW parity update protocol performs correctly if one or more nodes fail during the protocol. If the driver node fails during the protocol, then the protocol completes without it; in effect the first node in the forwarding message chain becomes the successor driver node. If an intermediate node fails, then the driver node will not receive the return/forwarded acknowledgement message within a reasonable time. In this case, the failed node or nodes are removed from the forwarding chain and the protocol is restarted by the driver node. Any node that had received a commit message but not yet received an acknowledgement simply forwards the new commit message down the new forward ordered chain and awaits acknowledgement, while maintaining the previous lock and any intermediate parity computations. Any node that had not yet received the initial forwarded commit message was unaware that a previous FSW protocol was in process; it proceeds in the normal fashion, utilizing the new forward chain (the forwarding chain may be embedded with the commit message to avoid any issue of message forwarding, though this is not a requirement).

The parity update protocol may be extended to higher fault tolerance. If a data strip is encoded into three or more parity values on three or more parity nodes, then the parity update protocol includes all the nodes in the stripe, including all the parity nodes regardless of how many there are in the stripe.

Each node that needs to perform a FSW can initiate the FSW protocol via an FSW request message, independently of any other node that may want to perform a FSW protocol. Multiple FSW protocols may be execute/run concurrently within the same stripe. Other options to prevent multiple concurrent FSWs are possible as well. In one embodiment, the FSW protocol comprises a one-phase commit protocol, with simple locking and unlocking at each node. There is no preparation phase (that is implied by the non-rejection of a first FSW request). Recovery from a storage device failure during the FSW protocol is handled as a roll-forward protocol restarted by a successor driver node in the forwarding messaging order, as described in more detail further below.

Two example implementations of FSW for maintaining parity coherency are described below.

RAID6

Figure 4:
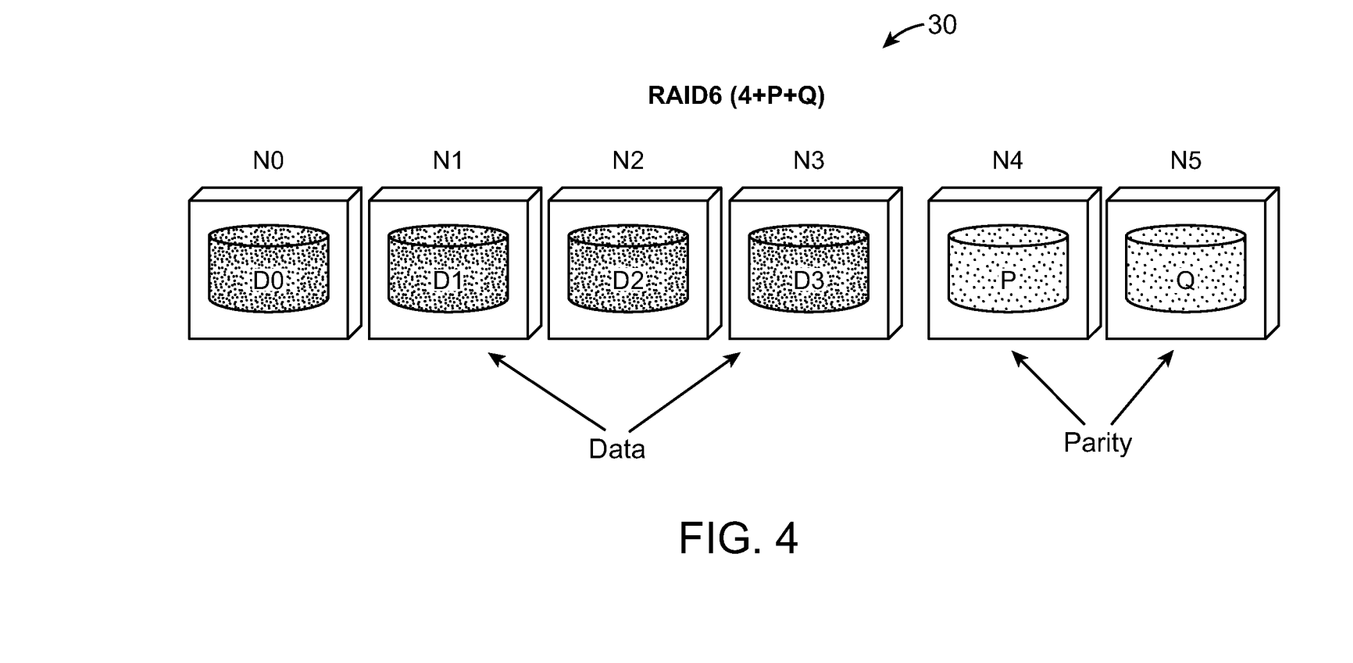
FIG. 4 shows an example embodiment of data and parity layout for a distributed storage system implementing a RAID6 erasure code.

FIG. 4 shows an example distributed RAID data storage system 30, illustrating data and parity relations for the RAID6 erasure code on four data nodes (N0 through N3) and two parity nodes N4, N5, with fault tolerance two. RAID6 provides a RAID storage system with a striped set and dual distributed parity with fault tolerance from two disk drive failures (the storage system can continue operation when one or two disk drives or nodes fail).

FIG. 4 shows four data strips D0 through D3. According to an embodiment, a P parity is computed with a mathematical formula (e.g., exclusive OR) of the four data strips D0 through D3. Further, a Q parity is computed by a different mathematical formula (e.g., Reed-Solomon encoding). Other mathematical formulas may also be used. In this erasure code there are six data nodes and two parity nodes. The fast write data is sent initially to the assigned data node and then forwarded to each of the parity nodes. As such, each of the parity nodes can determine without ambiguity if a full stripe write of new data is present in the stripe. Consequently, both node N4 (holding P) and node N5 (holding Q) may be assigned the role of potential driver. In the preferred embodiment, one of them is chosen as the only driver for the stripe, though this is not a requirement of the invention. In the subsequent description, N4 will be given the role of sole driver of the FSW parity update protocol. One forwarding order for N4 is then N5<N0<N1<N2<N3, (any ordering is allowed here). If both N4 and N5 are potential drivers, then the order for N4 may be as indicated and for N5 it may be N4<N0<N1<N2<N3, though other arrangements are possible.

Figure 5:
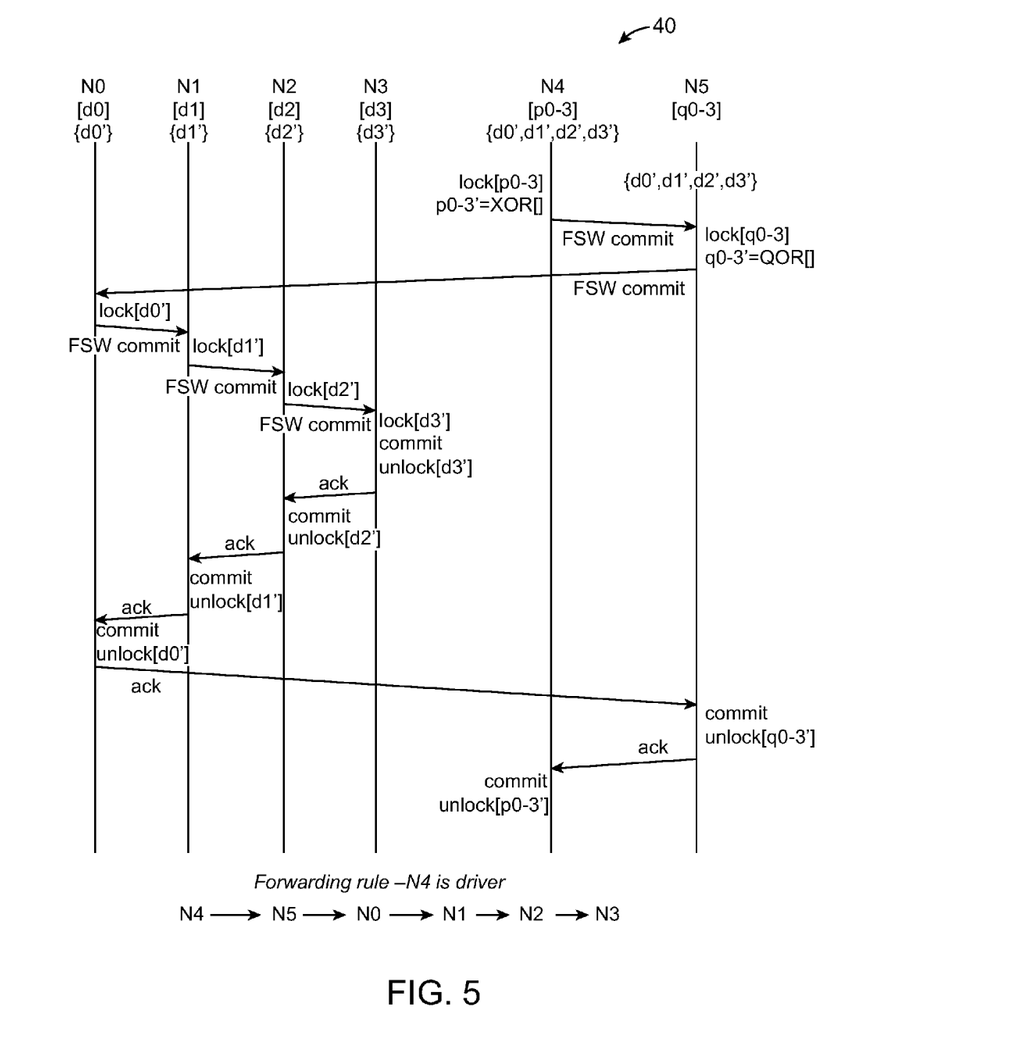
FIG. 5 shows an example event sequences in FSW protocol processes for maintaining parity coherency in a write-back distributed data storage system implementing a RAID6 erasure code.

FIG. 5 shows an event sequence 40 (top-bottom) for the FSW parity update protocol implemented by system 30 of FIG. 4, according to one embodiment of the invention, wherein node N4 is the driver of the protocol. The forwarding rule diagram at the bottom of the FIG. 5 indicates the forwarding order for the messages in the protocol. Each vertical line represents a node in the storage system that holds and is responsible for data in a RAID6 stripe with 4 data strips and parities P and Q (so RAID6(4+P+Q)). Other nodes in the storage system not related to this stripe are not represented. Nodes labeled N0, N1, N2 and N3 each hold a data strip for the stripe. Node labeled N4 holds the P-parity and node labeled N5 holds the Q-parity. The expressions [d0], [d1], [d2] and [d3] represent data versions that are integrated into the parity represented by [p0-3] and [q0-3]. The expressions {d0'}, {d1'}, {d2'} and {d3'} represent fast write data received at a node. The expressions p0-3' represents the working copy of the new P parity maintained on parity node N4, until this value is committed. Similarly, the expression q0-3' represents the working copy of the new Q parity maintained on parity node N5 until it is committed. The expression "FSW-commit" indicates a message between two nodes that requests participation in the FSW parity update protocol and triggers the appropriate action on each node. The expressions "lock[X]" and "unlock[X]" represent the action of locking and unlocking respectively, the indicated data or parity strip. The expressions p0-3'=XOR[ ] and q0-3'=QOR[ ] represent the mathematical relationship whereby p0-3' and q0-3' are computed from d0', d1', d2' and d3' (the input values are suppressed for brevity in the diagram). Typically, but not essential to the protocol, p0-3' is the exclusive OR (XOR) of the input values and q0-3' is computed in a different way (e.g., by Reed-Solomon formulas) from the same inputs. The expression "commit" means that the fast write data or the parity computed from the fast write data is committed as the new parity integrated value. Finally, the expression "ack" represents a response message indicating successful completion of all the FSW parity update protocol steps at sending node. The relative size of the time gaps does not necessarily represent time to scale; it represents only relative ordering in time. Arrows connecting vertical lines represent messages sent between the respective nodes.

The FSW protocol is initiated by node N4 at some time after it determines that it has received a full stripes worth of new data {d0'}, ..., {d3'}. In the RAID6 erasure code, the optimal place for replicated fast write data is at the two parity nodes N4 and N5. Consequently, in this embodiment, node N4 can determine unambiguously that the full stripe of new data is available and the stripe is prepared for a FSW protocol. Node N4 begins the protocol as described in FIG. 3 by first locking its fast write data and parity from update (this prevents the contents from changing during the protocol so all nodes implicitly agree on the version of the data they will commit at the conclusion of the protocol). It then computes the new value of the P parity (this may be performed before, during or after sending the first message) and sends the "FSW commit" message to node N5, the first node in the forwarding sequence. On receipt of the message, N5 locks its data and parity, computes the new value of the Q parity and forwards the "FSW-commit" message to node N0, the next node in the forwarding order. As for N4, node N5 can compute the new Q parity either before (anticipating the FSW protocol start) or after sending the message.

The only requirement for the computation of both the new P and Q parity values is that they be computed before their respective nodes send the "ack" message and commit. Each data node in the forwarding sequence, other than the last node, locks its fast write version of data from update (e.g., by a new host write) and then forwards the "FSW-commit" message to the next node in the forwarding order. The last node, essentially as one operation, locks, commits and unlocks its fast write data, then sends the first "ack" message back to the node in the reversed forwarding sequence (this will always be the node that sent the "FSW-commit" message to the last node). Each data node in the reverse sequence, on receiving an "ack" message, commits and unlocks its fast write data, then forwards the "ack" message to the node in the reversed forwarding sequence. The node N0 sends its "ack" message to node N5 (the Q parity node). On receipt of the "ack" message, node N5 commits and unlocks its newly computed value of Q parity, q0-3', as the parity integrated version and forwards the "ack" message to node N4. On receipt, node N4 commits and unlocks its newly computed value of P parity, p0-3', as the parity integrated version. This completes the FSW parity update protocol.

Note that this protocol cannot fail because a node does not have the necessary data available. Each data node must have a fast write copy of new data, since node N4 shares such copies with each data node and N4 would not begin the protocol if this were not the case. Similarly, because N5 is also a recipient of copies of fast write data, N4 is assured that because N4 has copies of all the fast write data, then N5 must also. Because all nodes have the requisite data in hand, the protocol can proceed without any data movement between nodes and without any disk reads to access the fast write data.

An additional step in most embodiments may be storing the newly committed parity integrated data or parity to disk. Once all the nodes have agreed to the committed version of data and/or parity, each node can de-stage their data or parity to disk without additional coordination with the other nodes.

Weaver

Figure 6:
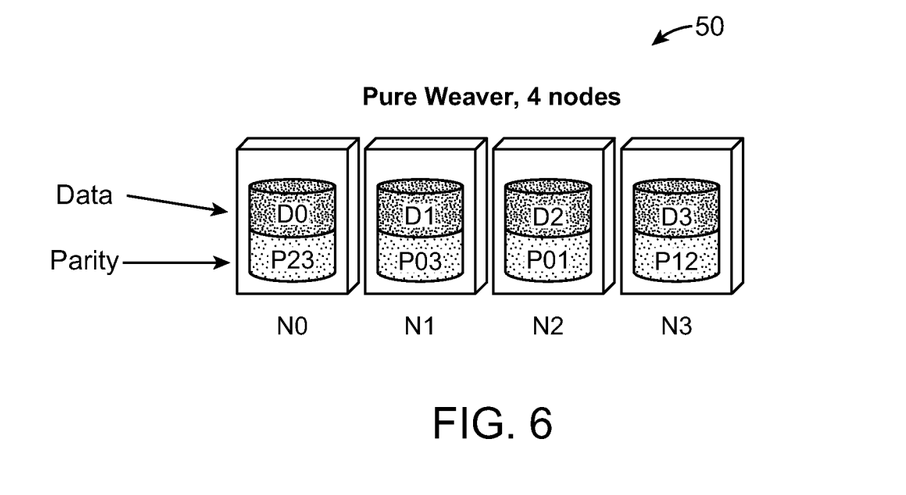
FIG. 6 shows an example embodiment of data and parity layout for a distributed storage system implementing the Weaver erasure code.

FIG. 6 shows an example distributed redundancy data storage system 50, illustrating data stripes D0, D1, D2, D3 and parity P23, P03, P01, P12, for the Weaver code on 4 nodes (N0 through N3), with fault tolerance two. The design features of Weaver codes include: (a) placement of data and parity blocks on the same strip, (b) constrained parity in-degree, and (c) balance and symmetry. These codes are in general not maximum distance separable (MDS) but have optimal storage efficiency among all codes with constrained parity in-degree. Weaver codes are described in James Lee Hainer, "WEAVER Codes: Highly Fault Tolerant Erasure Codes for Storage Systems," published at http://www.usenix.org/events/fast05/tech/full_papers/hafner_weaver/hather_weaver.pdf, December 2005.

In FIG. 6, each node performs three roles in this erasure code. Each node is a data node and each node is also a parity node for two other data nodes. A fast write protocol mirrors copies of fast write data (new data) at each data node (where the data is ultimately stored) and at each of the nodes holding parity data that should contain this data. For example, fast write data d0 would be mirrored to node N0 (because it holds D0), to N1 (because it holds P03, a parity for D0) and N2 (because it holds P01, the other parity for D0). Fast write data D1 would be mirrored to node N1 (because it holds D1), to N2 (because it holds P01, a parity for D1) and N3 (because it holds P2, the other parity for D1). And, so on.

In the FSW protocol, parity is determined directly by computing new parity values for all data strips of a stripe from the full stripe's worth of fast write data (no read of data or parity from disk is required). In one example, a node, N0, has three new fast written data values (i.e., host has written new data d0, d2, d3, corresponding to data strips D0, D2, D3, respectively). That is, N0 is holding new fast write values for three of the four data strips (d0', d2' and d3') in the stripe. Note that node N0 cannot determine unambiguously whether a new fast write value d1' has been written by the host because it is not involved in the fast write of d1. There is, however, a strong likelihood that d1' has been written by the host, for example, as part of a large sequential write. This suggests that N0 can optimistically presume that d1 has also arrived at each of the other nodes (N3 in particular with respect to N0 as N3 has no parity connection to the data responsibility of N0 (for d0)). The situation where N0's optimistic assumption is false is described further below.

An alternative approach is for N0 to send a query message to node N1 to determine if a new d1' is present in the strip. However, this is unnecessary as a separate step in the FSW protocol described herein because the first message from N0 to N1 implicitly asks this question. Successful completion of the protocol means d1' was present; abort or failure of the protocol will happen if d1' was not present.

New data d1' factors in because the protocol generally requires that there be a new fast write data for all the data strips in the stripe. N0 ensures arrival of d1' indirectly by sending the first message to N1: (a) if N1 signals "reject", that informs N0 that d1' has not arrived; (b) if N1 accepts (forwards and eventually responds with "done"), that informs N0 that d1' had arrived as well as completes the FSW protocol. Further, N2 and N3 each have copies of two of the fast write copies that N0 has: N2 has d2' and d0' as does N0 and N3 has d2' and d3' as does N0. N2 is missing d3' but has d1' and N3 is missing d0' but has d1'.

Note that each of the nodes has an analogous view of the stripe. Each knows that three of the four data strips have new fast write data, though which three is a function of the specific node. For example, node N1 knows that d1', d0' and d3' are present, but is not assured that d2' is present. Similarly, for N2 and N3. This means that any one of the four nodes N0, N1, N2, N3 is in a position to optimistically initiate a "FSW commit". That is, for a system implementing the WEAVER code, each of the nodes may be a potential driver of the FSW protocol (this is in contrast to the RAID6 embodiment described above where only P parity node or the Q parity node has sufficient information to know (or optimistically assume) that a full stripe worth of new fast write data is present in the stripe.) If two nodes essentially simultaneously initiate the protocol, the forwarding order effectively will block one of them from proceeding and thus no inconsistent state of the stripe will occur.

Figure 7A:
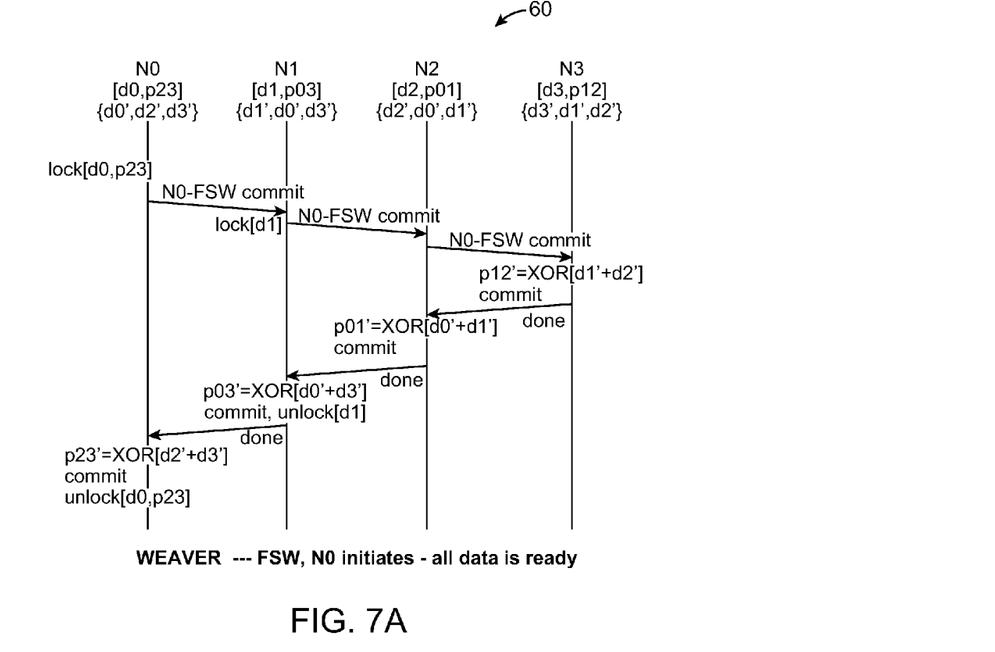
FIG. 7A shows an example event sequence in FSW protocol processes for maintaining parity coherency in a write-back distributed data storage system implementing the Weaver erasure code.

FIG. 7A shows an event sequence 60 (top to bottom) for the parity update protocol implemented by system 50 of FIG. 6, according to an embodiment of the invention, wherein node N0 initiates the protocol. The symbols and notation are similar to that used in FIG. 5, only the differences in notation are mentioned below. The term "N0-FSW commit" represents a FSW protocol commit message, with the prefix "N0" indicating that N0 is the driver of the protocol. For the cyclic ordering, this also indicates that N3 is the end of the forward chain (N3 does not forward to the driver). It is also used to avoid ambiguities if more than one node initiates the protocol at essentially the same time. The expression "unlock[ ]" is an abbreviation for the unlock operation that undoes the "lock [X]" action earlier in the protocol. In this example of the FSW protocol, the computation step for new parity at each node occurs prior to sending the "ack" message, not before forwarding the "N0-FSW commit" message as in the description for FIG. 5. As noted, both options are possible, as are other options such as pre-computing the new parity values (but not committing them) in anticipation of a node initiating the FSW parity update protocol. These options are all within the scope of the protocol.

In FIG. 7A, the protocol is initiated by the driver node N0 according to the flow diagram of FIG. 3. Node N0 determines that three of the four pieces of new fast write data is available in the stripe and optimistically assumes that the fourth piece, d1' is also available. On the condition that this assumption is correct, the protocol proceeds as follows (the case where the assumption is false is given below in the description for FIG. 7B). Node N0 locks its data and parity from update, the sends the first "N0-FSW commit" message to node N1, the first node in the cyclic forwarding order (as indicated by the graphic below FIG. 7B). On receipt, and because N1 has new d1' fast write data, N1 locks its data and parity from update, and forwards the "N0-FSW commit" message to node N2 (next in the sequence). On receipt, N2 performs the analogous steps of locking and forwarding to N3. Node N3 also locks its data and parity, but recognizes that N0 is the driver and N3 itself is the end of this forwarding chain. Consequently, N3 computes its new parity value p12', commits and unlocks its data and parity, and sends the first "ack" message back up the reversed message chain to N2. Node N2 computes its new parity value (or it may have done this while awaiting response from N3), commits and unlocks its data and parity values, then it forwards the "ack" message back to N1. Node N1 performs the analogous steps of computing new parity, committing and unlocking data and parity, then forwarding the "ack" message back to the driver node N0. On receipt, N0 computes its new parity, commits and unlocks its data and parity and concludes the protocol. Note that N0 determines that its optimistic assumption that d1' was available in the stripe is true by the "ack" message from N1, that is, by the successful completion of the protocol.

Figure 7B:
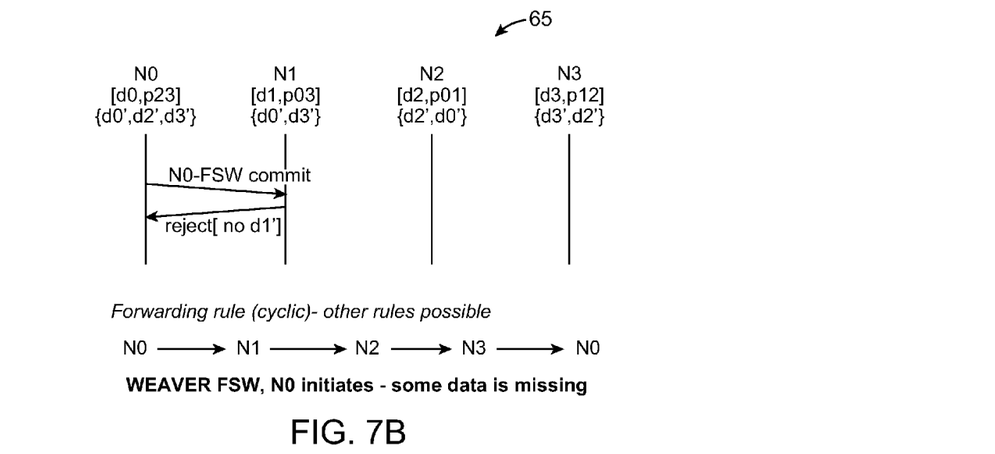
FIG. 7B shows another example event sequences in FSW protocol processes for maintaining parity coherency in a write-back distributed data storage system implementing the Weaver erasure code.

FIG. 7B shows an event sequence 65 (top to bottom) for the parity update protocol implemented by system 50 of FIG. 6, according to an embodiment of the invention, wherein node N0, optimistically assuming that all four pieces of new fast write data is available in the stripe, initiates the protocol. If node N1 does not have a fast write copy of d1 (only d0', d2' and d3' was written), then node N1 simply rejects the protocol in the first step and no change is made to the committed versions of the data or parity. Such a reject message tells N0 that d1' was not available and so the FSW protocol cannot complete successfully. That is, N0 determines that its optimistic assumption is false by the rejection of its first message.

FIG. 7B also shows a forwarding rule that indicates one choice for the forwarding order for each node, if each node assumed the role of driver of the protocol for the embodiment of the system in FIG. 6. In this preferred embodiment, the nodes are ordered in a cyclic fashion. For example, if node N2 becomes the driver, then N2 sends first to N3, then the message is forwarded to N0 and then to N1.

The forward ordering is defined by the cycle N0→N1→N2→N3→N0, where each node starts the FSW protocol at its position in the cycle and moves forward. However, any ordering is possible, so long as all nodes are included. Note that two nodes would only initiate the FSW protocol concurrently if all the new data for the stripe is present in the stripe. Since the FSW protocol only moves forward, even in the presence of failures, two simultaneous FSW protocols can both move forward together without conflict, or the second one received at a node in a "locked" state can be rejected.

In the WEAVER embodiment of the system in FIG. 6, the FSW protocol may fail if the missing piece of new data is not available (this is known by all nodes except the initiating one so any choice of forward order is correct). It may also fail if two such protocols are initiated simultaneously or if another parity update protocol such as read-modify-write protocol is in progress at a given node (indicated by a lock). However, a failure is manifested by a "reject" message from any node, and this is returned up the reversed message chain. This prevents any commit action at any node and avoids inconsistent state.

If a node fails during the FSW protocol, the "successor" driver (defined as the closest to the driver in the forwarding order) restarts the protocol if it has received the FSW request from the driver node, and not yet received the ACK from a down-stream node. If the successor driver has received the ACK, then the FSW protocol is actually complete with respect to all surviving nodes. If the successor driver has not received the FSW request from the driver, then as far as the survivors are concerned, no FSW protocol was ever initiated (so no recovery is needed).

A restarted FSW protocol should exclude from the protocol any node that either failed (triggering the restart) and any node given the new responsibility for a failed node (i.e., the restarted FSW protocol should restart only with the survivor nodes). This is easily achieved by including in the FSW request message either a list of included participant nodes or a list of excluded (prior) participant nodes. In the latter case, the initial FSW protocol has an empty exclusion list; a restarted FSW protocol contains an exclusion list of the failed nodes.

The distributed redundancy storage systems employing a fast write protocol may not be able to complete (to the host or back to the fast write upstream node) while a FSW is in progress (unless the fast write data is buffered separate from the data in the FSW). A fast write during the FSW protocol is suspended or rejected (at any node where it is received) until the FSW protocol is complete. Any incomplete fast write data (incomplete in the fast write protocol) present on a node when the FSW request message arrives is not included in the FSW protocol (this requires buffering incomplete fast write data). Alternatively, the FSW protocol may be rejected and retried after the fast write protocol completes.

There are a number of design alternatives for concurrent FSW protocols. First, they can run in parallel as follows. When the commit message arrives (and a node has the required data), it increments a lock counter. Two such messages simply increment the counter twice. When the node executes the compute and commit step it decrements the counter. When the counter is zero at a node, all active FSW protocols are complete at that node.

If an FSW request forwarded message arrives at a node after it has acknowledged during a previous FSW protocol, the node has no fast write data to commit, and so rejects the second FSW request. It is possible to reject any FSW commit message if one is already in progress but this may lead to starvation (though very unlikely). However, a simple alternative is to prioritize driver nodes, for example, by giving the node with the smallest label higher priority. If a node receives two FSW request messages from different driver nodes, the node rejects the one with the larger label and proceeds with the FSW request from the smallest label. This may prevent deadlocks as well as starvation.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to a processor for execution. Such a medium may take many forms, including but not limited to, non-volatile media, volatile media and transmission media. Non-volatile media includes, for example, optical or magnetic disks. Volatile media includes dynamic memory. Transmission media includes coaxial cables, copper wire and fiber optics, including the wires that comprise a bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of maintaining data storage reliability in a write-back distributed data storage system including multiple nodes, each node comprising an array of failure independent data storage devices, the method comprising:

storing information as a stripe including a collection of data strips and associated parity strips, the stripe distributed across data and parity nodes;

each data node maintaining an associated data strip holding a first copy of data, and each parity node maintaining a parity strip holding a parity for the collection of data strips;

a driver node initiating a full-stripe-write parity update protocol for maintaining parity coherency in conjunction with other nodes comprising data and parity nodes, by determining parity directly by computing new parity values for all data strips of a stripe from fast write data in order to keep the relevant parity strips coherent, wherein any node may function as a driver node; and upon detecting new data:

writing new data to one or more strips in a stripe;

the driver node computing new parity if the driver node is a parity node, and sending a commit message to another node in a predefined message order sequence; and each respective node receiving a commit message computing new parity if that respective node is a parity node, and sending a commit message to a next node in the predefined message order sequence unless that respective node is a last node in the predetermined message order sequence, wherein each parity held by a parity strip is calculated based on a different parity calculation formula for each parity.

2. The method of claim 1, further comprising:

starting from the last node in the predefined message order sequence, on receiving a commit message each respective node computing new parity if that respective node is a parity node, and sending an acknowledgement message to an immediately prior node in the predefined message order sequence unless that respective node is a first node in the predetermined message order sequence, wherein each respective node upon receiving an acknowledgement message commits one of: new data and newly computed parity, new data, or newly computed parity.

3. The method of claim 2 further comprising:

the driver node initiating the full-stripe-write parity update protocol upon determining that the new data comprises a full stripe of new data.

4. The method of claim 2 further comprising:

each data node locking its new data then sending a commit message, and upon committing, unlocking its new data; and each parity node locking its parity data then computing new parity and sending a commit message, and upon committing, unlocking its new parity.

5. The method of claim 3 further comprising:

each data node maintaining at least two versions of the data for a strip, a fast write version and a parity-integrated version, wherein the fast write copy has been written into a storage system by a host or client and not integrated into a parity strip, and wherein the parity-integrated version has been incorporated into a process for defining a parity value; and transitioning the fast write version to the parity-integrated version at completion of a parity update protocol at all relevant data and parity nodes, whereby the prior parity-integrated version is discarded.

6. The method of claim 5 further comprising, in each parity node:

maintaining a working version of its parity strip value containing a current parity-integrated value for each of the data strips computed into that parity strip; and at the end of the parity update as viewed by each parity node, the parity node transitioning the working version to the parity-integrated value and discarding a previous parity-integrated value.

7. The method of claim 3 further comprising:

upon a node failure, performing a roll-forward full-stripe-write protocol restarted by a successor driver node in the messaging order.

8. The method of claim 1, wherein determining parity directly is based on computing new parity values for all data strips of a stripe from a full stripe's worth of fast write data.

9. The method of claim 1, wherein parity is determined directly from the data strips.

10. The method of claim 1, wherein the driver node comprises any node in a stripe.

11. The method of claim 10, wherein the driver node is one of a data node and a parity node.

12. The method of claim 11, wherein the driver node is one of predetermined and self-elected.

13. The method of claim 12, wherein the driver node is assigned.

* * * * *